Dec. 13, 1966  A. BRAMLEY  3,291,897
ELECTRICALLY CONDUCTING ROPE
Filed Jan. 10, 1964  2 Sheets-Sheet 2

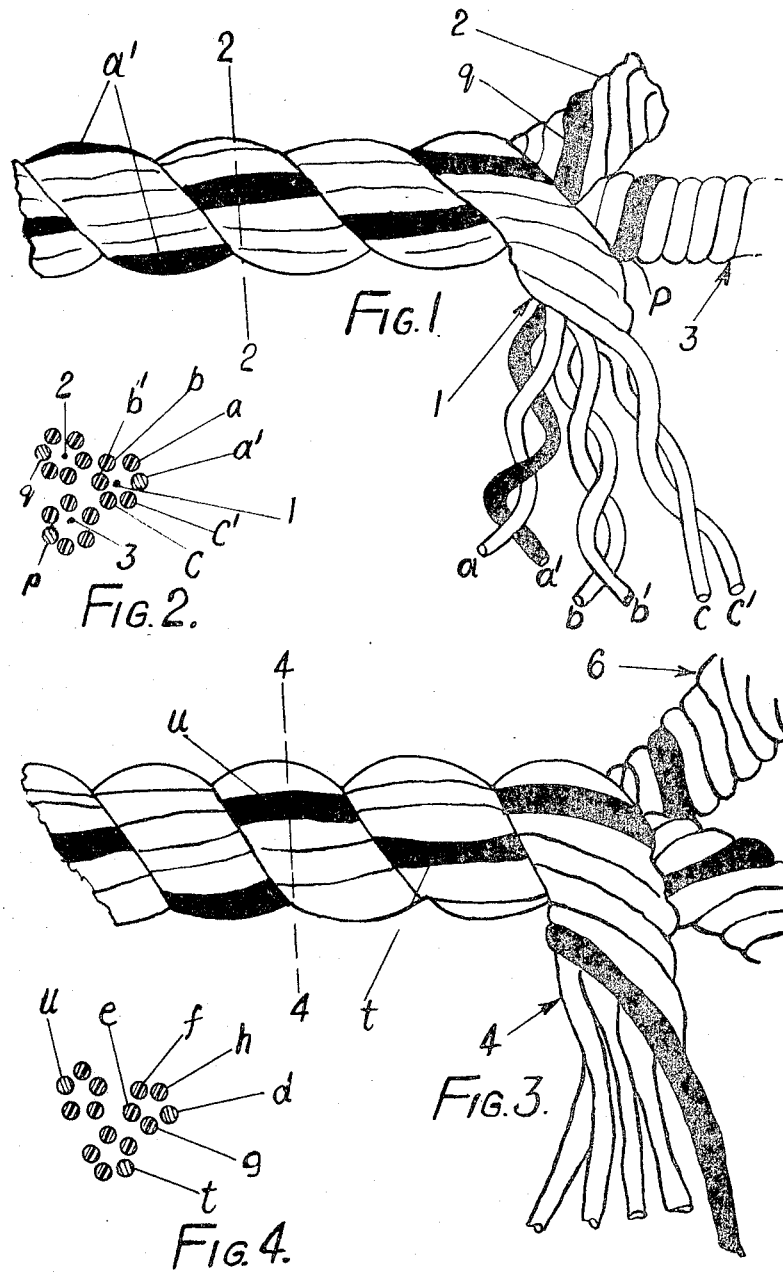

INVENTOR
ANTHONY BRAMLEY
BY Larson and Taylor
ATTORNEYS 3,291,897
ELECTRICALLY CONDUCTING ROPE
Anthony Bramley, Gosford House, Gosford, Kidlington, Oxford, England
Filed Jan. 10, 1964, Ser. No. 337,016
Claims priority, application Great Britain, Jan. 12, 1963, 1,493/63
5 Claims. (Cl. 174—126)

This invention relates to electrical current conductors, and has for an object to provide an electrical current conductor of light weight and high strength, particularly suitable for use on electric fencing to prevent the straying of cattle or the movement of rabbits and other animals from one area to another and can also be used to control the movement of birds and to prevent them from alighting on window ledges and parapets of buildings.

For the purpose of the following specification and claims we use the word "twine" to describe the whole electrical conductor whether it is such as would be commonly called twine or whether it would be such as would commonly be called rope or cable in larger diameters. The several components which are twisted together to form the twine are called "plies." Each ply is formed by twisting together a number of filaments. We shall describe these components of the ply as "filaments" whether they be such as would be commonly called, if relatively coarse, monofilaments or, if relatively fine, multifilaments in the textile trade. There is not a limit to the size of structure which can be made to this specification but for clarity in describing the features we shall refer to the components of the electrical conductor as "plies" and "filaments" whether or not these might be commonly called "strands" and "yarns" in structures of larger diameter.

An electrical current conductor according to the invention comprises several plies twisted together, each ply consisting of a number of filaments, at least one of the filaments of at least one ply being a metallic conductor and at least one being non-metallic, the filaments of each ply containing a metallic conductor being so twisted together that the metallic conductor lies exposed on the surface of the ply at intervals determined by the amount of twist imparted to the ply.

Figure 5:
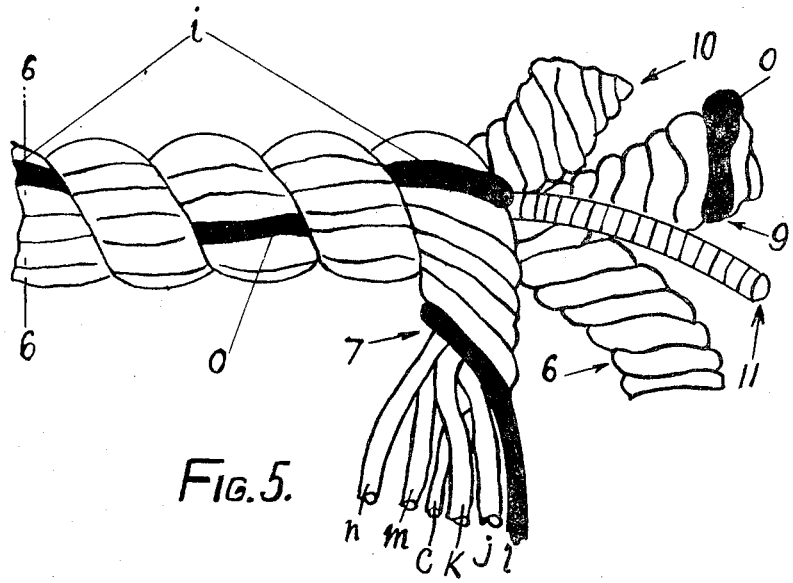
Figure 6:
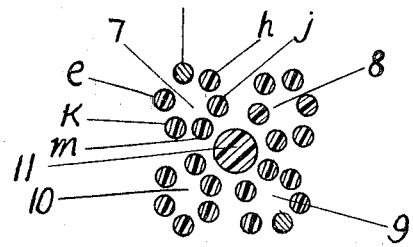

Practical embodiments of the invention are illustrated in the accompanying drawings in which FIG. 1 is a side elevational view of a three-ply twine made in three twisting operations, FIG. 2 is a cross-sectional view across the line 2—2 of FIG. 1, FIG. 3 is a side elevational view of a three-ply twine made in two twisting operations, FIG. 4 is a cross-sectional view across the line 4—4 of FIG. 3, FIG. 5 is a side elevational view of a four-ply twine with a core, and FIG. 6 is a cross-sectional view across the line 6—6 of FIG. 5.

Referring in detail to the drawings, FIGS. 1 and 2 illustrate a twine composed of three plies 1, 2, 3, although the number of plies is not a feature of the invention, but a three-ply twine is illustrated in FIGS. 1 and 2 and also in FIGS. 3 and 4 since a three-ply structure is the structure most conveniently made on conventional machinery. Two- and four-ply twines can, however, also be made comparatively easily on conventional machinery. Each ply consists of a number of filaments $a$, $a'$, $b$, $b'$, $c$, $c'$. The total number of such filaments is not a feature of the invention. The filaments are previously twisted together in groups. In the example shown the filaments are previously twisted together in groups of two. One filament of one group in each ply is a metallic conductor, the remaining filaments being of non-metallic material, preferably man-made fibre. In FIGS. 1 and 2 the metallic conductor filament is shaded and shown as $a'$ in ply 1, $q$ in ply 2 and $p$ in ply 3.

FIGS. 3 and 4 illustrate a twine composed of three plies 4, 5, 6, each ply being produced by one twisting operation. One filament of each ply is a metallic conductor as indicated by the shaded filaments $d$, $t$, $u$ in FIGURES 3 and 4.

FIGS. 5 and 6 illustrate yet another type of twine. This is a four-ply twine and the four plies 7, 8, 9 and 10 are twisted around a core 11 of insulating material. Two of the plies 7, 9 include a metallic filament denoted by $i$ and $o$ respectively. The ply construction for the plies containing the metallic filament may be of the type shown in FIGS. 1 and 2 and made in two twisting operations or of the type shown in FIGURES 3 and 4 and made in one twisting operation. The other two plies are made entirely of filaments of non-conducting material, preferably man-made fibre. These other two plies therefore act as insulators and insulate the metallic filament in ply 7 from the metallic filament in ply 9 so that these filaments may be at different electric potentials or one may be earthed. The plies 7 and 9 are also insulated from one another by the core which may either be of an extruded plastic insulator or may itself be a twisted structure composed of the same material as the strands 8 and 10. The diameter of the core required to achieve its object as an insulator depends on its compressibility. A diameter of one-third of the ply diameter has been found satisfactory.

In all the structures described above the amount of twist in the several twisting operations and the relationships between the twine twist and the ply twist should be within specific limits for optimum results. It is convenient to specify twist by the twist factor where the relationship is defined as:

$$\text{Twist (turns per inch)} = \frac{\text{Twist Factor}}{\sqrt{\text{Denier}}} \qquad (1)$$

The denier is the total resultant weight in grams of 9,000 metres of the elements twisted together.

Referring again to FIGURES 1 and 2 in the first twisting process in which the filaments $a$ and $a'$ are twisted together as a group, the filaments $b$ and $b'$ are twisted together as a group and the filaments $c$ and $c'$ are twisted together as a group.

In order to obtain the maximum amount of the metallic filament on the surface of each ply containing a metallic filament and therefore on the surface of the twine produced therefrom then during the manufacture of the ply the metallic filament itself in the embodiment illustrated in FIGS. 3 and 4 or the group of filaments containing the metallic filament in the embodiment illustrated in FIGS. 1 and 2 should be tensioned by the methods already known in the art to keep selected filaments on the surface of the ply and prevent such filaments, in this case the metallic filaments, from being buried within the ply by the non-conducting filaments.

In uses where the twine will be strained during use it is important that a minimum twist factor should be attained in forming each ply by twisting, otherwise the metallic filament will become strained differentially along its length through being insufficiently held by the compressive forces resulting from the twist. Then the wire elongates differentially so that on relaxation of the strain the metallic filaments will be buried within the non-conducting filaments in some parts of the twine and in other parts will protrude in loops and thus be vulnerable to damage by snagging. The ply produced in two operations as illustrated in FIGS. 1 and 2 is less prone to this difficulty than that produced in one operation as illustrated in FIGS. 3 and 4. A higher ply twist factor is required when forming the ply shown in FIGS. 3 and 4. The ply shown in FIGS. 5 and 6 is of the same type as shown in FIGS. 3 and 4, that is to say the ply is made in one twisting operation. The four-ply twine as described in relation to FIGS. 5 and 6 could also be made according to the invention with a ply made in two twisting operations in the same way as the ply illustrated in FIGS. 1 and 2.

To obtain the maximum effect from the minimum content of metallic filament it is necessary to arrange that the twine twist will bear such a relationship to the ply twist that the metallic filament will lie as close to parallel to the axis of the twine as is possible. This is obtained with the ratio of twine twist to ply twist given by:

$$\frac{\text{TWINE TWIST}}{\text{PLY TWIST}} = -\frac{r}{r+s} \quad (2)$$

Where $r$ is the radius of the ply and $s$ is the radius of the twine helix.

The negative sign denotes that the twine twist should be opposite in direction to the ply twist. Thus if the twine were two ply, $r=s$ and the twine twist would be half the ply twist.

The filaments to be used in all the constructions described in this specification can be made of any non-conducting material but preferably of man-made fibre. Examples of suitable man-made fibres are polythene, polypropyline, polyamide fibres, polyester fibres and fibres made from polyvinylchloride or polyvinylalcohol.

Polythene has been found to be a very suitable fibre for economic and practical reasons. Monofilaments of 0.015″ dia. have been found very suitable for making an electrical conductor for use in electrified fencing and netting. The metallic conductor may be of any metal in filament form. Economically viable alternatives are galvanised steel wire or tinned copper wire. For the manufacture of a twine for use in electrified fencing a metallic filament diameter of 0.008″ dia. has been found suitable in conjunction with polythene filaments of 0.015″ dia.

The following are examples of twine made in accordance with the invention:

A twine as illustrated in FIGS. 1 and 2 in which each group of filaments is twisted with 2.0 turns per inch Z. The ply is made by twisting together with 5.0 turns per inch S two groups each containing two 0.015″ diameter polythene monofilaments and one group containing one such polythene monofilament and one galvanised steel wire 0.008″ diameter. Three such plies are then twisted together with 2.0 turns per inch Z. The letters S and Z denote directions of twist wherein the letter S denotes twist in one direction and the letter Z denotes twist in the opposite direction.

A twine as illustrated in FIGS. 3 and 4 in which three plies are made by twisting together four polythene monofilaments of 0.015″ diameter along with one tinned copper filament of 0.008″ diameter using 5.5 turns per inch S. These three plies are then twisted together with 2.3 turns per inch Z.

Either of these examples provides a perfectly satisfactory electric fencing at about 10% to 12% of the weight of the usual all galvanised steel wire normally used for the purpose.

The conductor according to the invention is, because of its lightness, easy to carry, easily erected and easily tensioned, and minimises wear on supporting posts and insulators.

Twine according to the invention is particularly suitable for use in the manufacture of electrified netting which has many uses in agriculture and elsewhere.

What is claimed is:

1. An electrical current conductor comprising several plies twisted together, each ply consisting of a number of filaments, at least one of the filaments of at least one ply being a metallic conductor and at least one being non-metallic, the filaments of each ply which comprises a metallic conductor being so twisted together that the metallic conductor lies exposed on the surface of the ply at intervals determined by the amount of twist imparted to the ply, wherein the ratio of the twist used in joining the plies to the ply twist is equal to the ratio of the radius of the ply to the sum of the radius of the ply and the radius of the helix formed by the plurality of plies, and the direction of twist used in joining the plies is opposite to the direction of the twist of each ply.

2. An electrical current conductor as claimed in claim 1 in which each ply consists of several groups of filaments twisted together, at least one group of filaments comprising at least one metallic conductor which lies exposed on the surface of the ply at intervals depending on the amount of twist imparted both to the group and to the ply.

3. An electrical current conductor as claimed in claim 1 in which the direction of twist used to form the groups of filaments subsequently used to form a ply is opposite to the direction of twist of the ply itself.

4. An electrical current conductor as claimed in claim 1 including a non-conducting core, at least four plies laid around said core, at least two of the plies each comprising a metallic filament, each ply comprising a metallic filament being separated from the adjacent ply comprising a metallic filament by at least one ply comprising only non-metallic filaments.

5. An electrical current conductor as claimed in claim 1 in which the non-metallic material is a man-made fibre.

References Cited by the Examiner

UNITED STATES PATENTS 2,048,450  7/1936  Horn _____ 174—113 X
2,348,234  5/1944  Warren _____ 57—140 X

FOREIGN PATENTS 86,868  11/1957  Holland.

LEWIS H. MYERS, *Primary Examiner.*

JOHN F. BURNS, *Examiner.*

D. A. KETTLESTRINGS, *Assistant Examiner.*